Patented Jan. 2, 1951

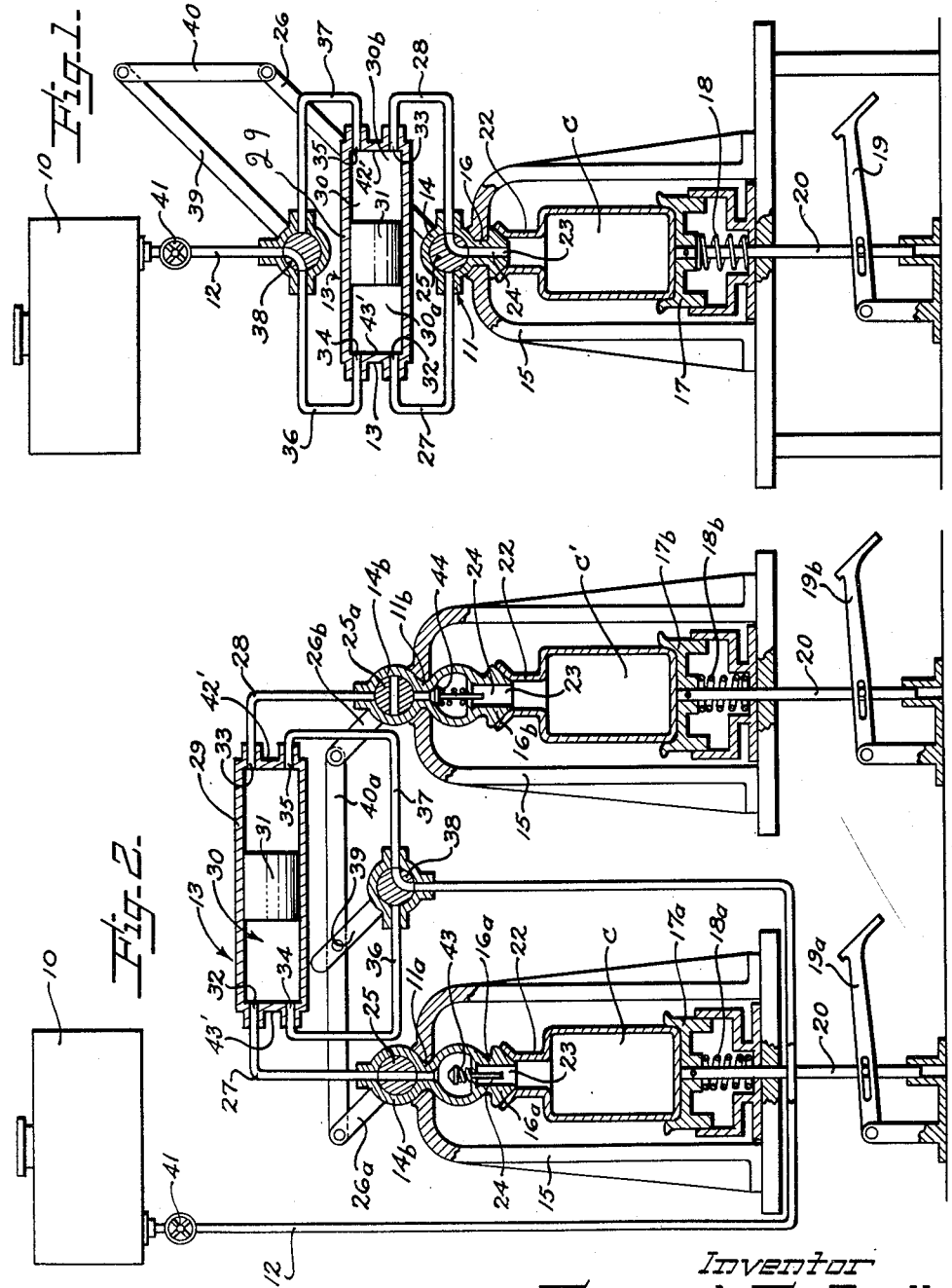

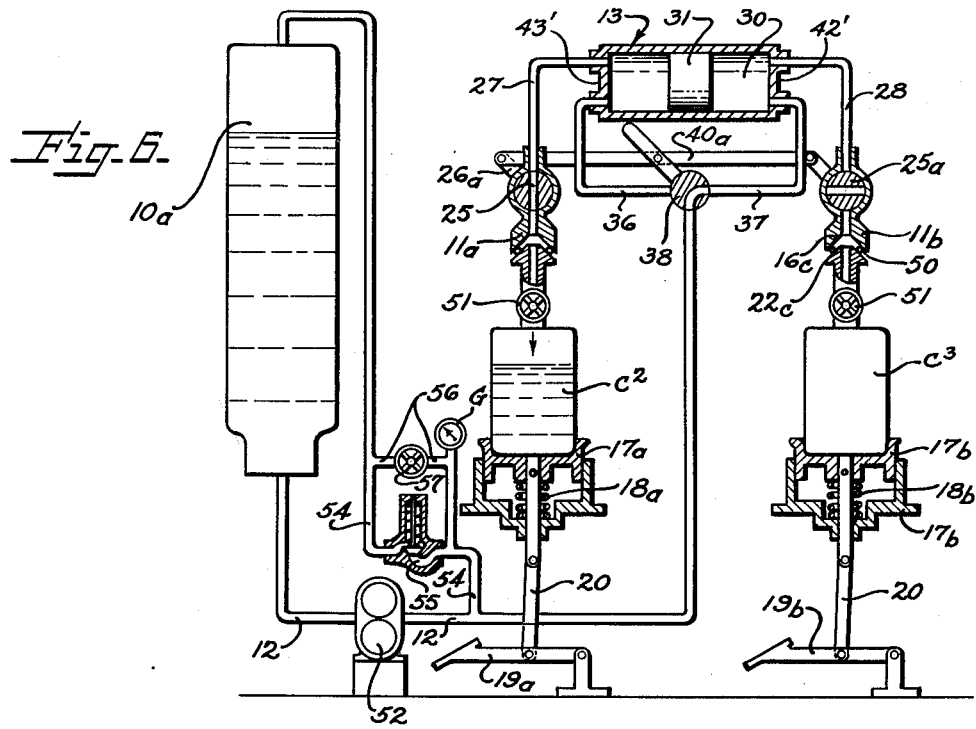
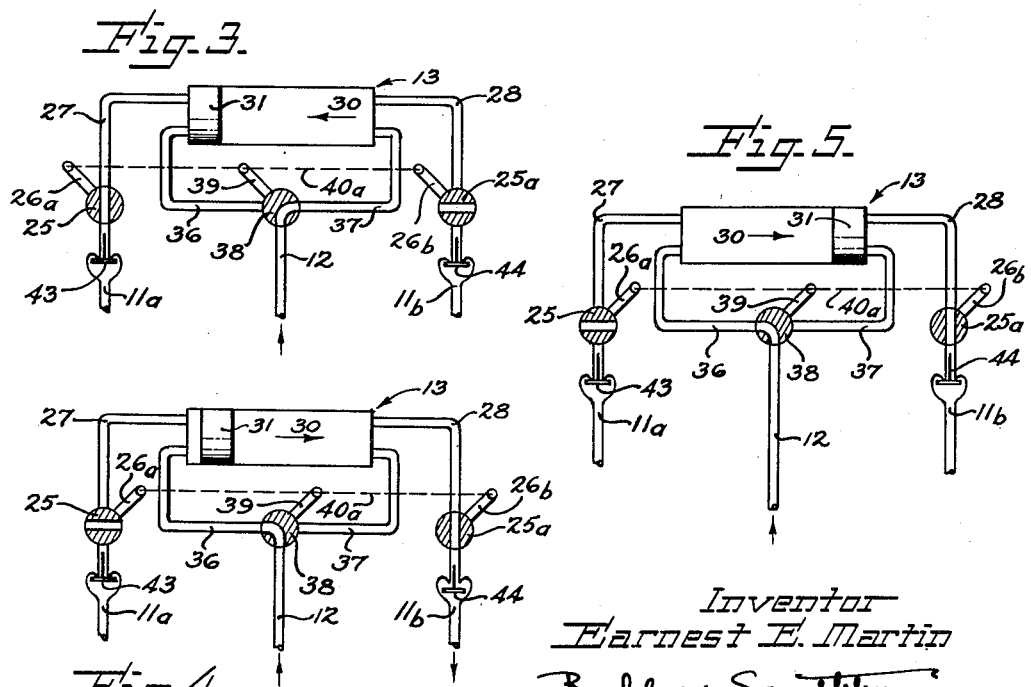

2,536,299

UNITED STATES PATENT OFFICE 2,536,299

PRESSURE FILLING SYSTEM

Earnest E. Martin, Pasadena, Calif., assignor, by mesne assignments, to Jessie F. Smith Application April 23, 1945, Serial No. 589,799

1 Claim. (Cl. 62—1)

This invention has to do generally with systems for filling relatively small containers with liquid taken from a relatively large suppy tank, and is more particularly concerned with a system wherein the liquid is pressurized in the delivery line and is pressurally effective to operate a meter which delivers measured charges to the containers.

It is among the general objects of the invention to provide a filling system of such nature that, with minimum operator attention and with maximum speed, it is assured that equal quantities of liquid are delivered to successively filled containers. The system is such that it is advantageously applicable in situations where the amount of fluid to be delivered to each container is critical, and yet where it is essential from an economical standpoint that the filling be accomplished with relatively great rapidity.

As one embodiment of my invention, I have disclosed a closed filling system which is particularly adaptable to the handling of volatile liquids even though their vapor pressures, at operating temperatures, are in excess of atmospheric pressure. The system is thus capable of handling liquefied petroleum gases such as butane, propane, isobutane, etc., as well as refrigerants such as dichlorodifluoromethane, commonly known as "Freon 12."

The capacity of the system to handle such liquids as "Freon 12" renders it particularly useful in connection with the filling of containers with so-called pesticide aerosols, such as mixtures of "Freon 12," pyrethrum and sesame oil, whether the ingredients be introduced separately or in mixture.

A feature of one embodiment of the system, whether or not it is of the closed type, lies in the provision of a plurality of filling heads and a metering arrangement whereby the filling is expedited due to the fact that, as a given container is being filled at one head, a filled container at the other head may be replaced by an empty container. It requires only the shifting of a valvular arrangement to accomplish the change of delivery from head to head and yet the single metering device, powered by the pressurized liquid in the delivery line, insures equal deliveries of fluid to successively presented containers.

Other objects and features of the invention will be made apparent in the following detailed description, reference being made to the accompanying drawings, in which:

Fig. 1 is a schematic view showing one embodiment of the invention;

Fig. 2 is a schematic view of a variational embodiment of the invention;

Figs. 3, 4 and 5 are schematic views showing the meter of Fig. 2 in various operating positions; and Fig. 6 is a schematic view of another embodiment of the invention.

In the system illustrated in Fig. 1, supply tank 10 is positioned sufficiently high above filling head 11 to insure a gravity head of a value which will maintain the liquid in delivery line 12 pressurized to an extent which will operate meter 13 in the manner to be described. In this particular embodiment it is assumed that the liquid being handled has a vapor pressure which, at operating temperatures, is not in excess of atmospheric pressure.

Filling head 11 is represented schematically as having a body member 14 supported by standard 15 so its delivery nozzle 16 is in vertical alinement with elevator 17, the latter being urged upwardly by spring 18 and being retractible against the action of the spring by actuation of lever 19 which is connected by rod 20 to the elevator. By depressing the free end of the lever and thus lowering the elevator, an empty container C may be placed on the elevator below head 11. Pressure on the lever is then released and spring 18 acts through the elevator to move the mouth of the container neck 22 into filling relation with nozzle 16, the orifice 23 of nozzle 16 then being in communication with the interior of the container. In certain filling operations, spring 18 forces the container neck into seal-tight engagement with the nozzle.

Nozzle bore 24 opens to two-way valve 25 in body member 14, which valve is operatable by lever 26 to put bore 24 selectively into communication with flow lines 27 and 28.

Meter 13 is in the form of a cylinder 29 defining a chamber 30 through which a floating piston 31 is adapted to reciprocate. At opposite ends of the cylinder are outlet ports 32 and 33 which open, respectively, to flow lines 27 and 28. Opening to opposite ends of the cylinder are inlet ports 34 and 35 which open, respectively, from flow lines 36 and 37. The flow of fluid selectively to lines 36 and 37 from delivery line 12 is controlled by two-way valve 38, adapted to be operated by lever 39. Preferably, though not necessarily, levers 26 and 39 are connected by link 40, for simultaneous actuation. Preferably, a shut-off valve 41 is provided in delivery line 12 at a point adjacent tank 10.

Fig. 1 represents a stage in the operating cycle where container C is being filled from the chamber side 30b at the right of piston 31. Valve 38 holds delivery line 12 in communication with flow line 36 and cuts off communication between the delivery line and flow line 37. Valve 25 puts flow line 28 (now the meter out-put line) into communication with nozzle bore 24, and, at the same time, blocks off flow from line 27 to said bore. Consequently, the pressurized liquid in line 12 moves piston 31 to the right and forces liquid in chamber 30b, at the right of piston 31 (which liquid entered that side chamber during an earlier period in the cycle) into container C.

The right hand end wall 42' of the cylinder forms a stop for piston 31, and when that stop is reached, flow to the container will, of course, cease. Thereupon, lever 19 is actuated to lower elevator 17, the filled can is replaced by an empty can, and spring 18 is allowed to seat the neck of the new can against nozzle 16.

With piston 31 at the extreme right of the cylinder, chamber 30a at the left of the piston is, of course, filled with the liquid which powered the piston in its travel to the right. The effective cubical displacement of the meter is such that it represents a volumetric measure of the fluid to be delivered to a container of given cubical capacity. When there is seal-fit between the container neck and the nozzle, a container will be chosen which has sufficiently greater capacity than the measured delivery as to insure that air compressed within the container by the flow of liquid is ineffective to prevent full delivery.

With the empty container in proper relation to nozzle 16, link 40 is operated to cause simultaneous actuation of valves 38 and 25; valve 38 being actuated to open line 12 to line 37 and to prevent flow between lines 12 and 36, while valve 25 is actuated to open line 27 to nozzle bore 24 and to close line 28 from the nozzle bore. The pressurized liquid in line 12 then acts through chamber 30b against piston 31 to move the latter to the left until it contacts the end 43' of the cylinder, thus again delivering a full, measured charge of liquid to a container.

The liquid entering chamber 30b and powering the piston in its stroke to the left, becomes the measured charge for filling the next container when valves 25 and 38 are subsequently restored to the positions of Fig. 1 following replacement of the last-filled container by an empty container.

In Fig. 2 is illustrated an embodiment of the invention wherein a single meter alternately supplies measured quantities to two filling heads. This arrangement results in very considerable time-economy since, while one head is delivering its charge of liquid to a container, the full container applied to the other head may be replaced by an empty container, said other head thus being put in a condition of readiness so it may start to fulfill its delivery function immediately after the completion of delivery by the first head. The control valves for the two heads are preferably, though not necessarily, connected for simultaneous movement, thus automatically operating in timed relation, as will later appear.

Elements which are the same as those of Fig. 1 will be given the same reference numerals and the description applied to those elements in connection with Fig. 1 are to be considered as applied to the similar elements of Fig. 2. This system of numbering and omission of repetitive description will apply also to other embodiments which will be described later.

The two filling heads 11a and 11b are mounted in operative association with elevators 17a and 17b, respectively, and are similar to head 11 except that their respective valves 25 and 25a are of the one-way type and preferably, though not necessarily, their nozzles 16a and 16b are provided, respectively, with spring-loaded, drip-preventing valves 43 and 44. In Fig. 2, flow lines 27 and 28 individually connect with the valves 25 and 25a of heads 11a and 11b, respectively, rather than with opposite sides of a single head valve as in Fig. 1, while link 40a connects the operating levers 26a, 26b and 39 of the three valves 25, 25a and 38, respectively.

Similar parts of the device, are, in general, in the operating condition shown in Fig. 1, except that piston 31 is illustrated as being moved to the left through cylinder 29 by the gravity-pressurized liquid in delivery line 12 acting through valve 38 and flow line 37. This left-wise movement of piston 31 forces liquid from the portion of chamber 30 at the left of the piston and through flow line 27 and valve 25 into nozzle 16a, opening valve 43 against its relatively light spring pressure, and finally delivers the liquid to container C.

Fig. 3 illustrates the condition of the meter and valves at the end of the left-wise stroke of the floating piston, at which time there is a cessation of flow through line 27, and the measured charge of liquid has been fully delivered to container C. Valve 43 is spring-closed at this time and thus prevents drippage of liquid from flow line 27, valve 25 and the nozzle 16a of head 11a.

During the described left-wise movement of piston 31, valves 25a and 44 have, of course, closed off flow line 28 and nozzle 16b of head 11b. Consequently, the operator has time, while container C is being filled, to depress lever 19b, free the previously filled container from elevator or applier 17b, and replace it with an empty container C', which, by spring 18b is elevated into filling association with head 11b. So, as soon as container C is filled, the operator moves link 40a to the right, thus opening valves 38 and 25a to flow lines 36 and 28, respectively, and closing valve 25 (Fig. 4). The pressurized liquid in line 36 acts against piston 31 to move it to the right, the piston forcing the measured charge of liquid in chamber 30 at the right of the piston (said charge being that liquid which powered the piston in its left-wise movement) through flow line 28 and valve 25a into nozzle 16b, opening valve 44 against its relatively light spring pressure, and finally delivering the liquid to container C'. Fig. 5 illustrates the condition of the meter and valves at the end of the right-wise stroke of the piston, at which time there is necessarily a cessation of flow through line 28, and the measured charge has been fully delivered to container C'. Valve 44 is spring-closed at this time and thus prevents drippage of liquid from flow line 28, valve 25a and the nozzle 16b of head 11b. While container C' is thus being filled, the full container C is removed from the filling device and is replaced by an empty container.

In Fig. 6 there is illustrated an embodiment of the invention wherein the filling system is a closed one which is especially well adapted to handle liquids which have vapor pressures, at operating temperatures, in excess of atmospheric pressure. For instance, high-pressure supply tank 10a may contain dichlorodifluoromethane, whose vapor pressure at 70° F. is about 70 pounds above atmospheric pressure.

While I have shown this tank in association with a pair of filling heads, as in Fig. 2, it will be understood that it is equally feasible for association with a single filling head, as in Fig. 1. The filling heads and meter are constructed and operate just as described in connection with Figs. 1 through 5, except that nozzles 16c of the filling heads are here fashioned to insure seal-tight fit with container necks 22c. For instance, ring washers 59 may be carried by the heads for sealing engagement with necks 22c, springs 18a and 18b being of sufficient strength to insure the seal. Containers C2 and C3 are also provided with neck valves 51 adapted to be opened during the filling operation and immediately thereafter to be closed. The valves are conventionally illustrated, but it will be understood they may be of any suitable type. They may either be of the manually operated type or of the automatic check type.

Delivery line 12 leads from tank 10a to valve 38 and thus supplies and powers the meter just as previously described, except that in this instance a pressure pump, such as gear pump 52, is introduced in the delivery line for pressurization of the liquid, creating and maintaining sufficient pressure differential at opposite sides of piston 31 to force the measured flow of liquid into containers C2 and C3. By "pressurization," I mean development of liquid pressure to a value sufficient to force the liquid into the container against the pressure being built up in the container by compression of the air initially occupying it; or sufficient to power the meter piston against its delivery pressure and resistances.

In order to maintain a substantially uniform effective pressure on the liquid in line 12, pump 52 may be operated to impose a pressure of greater value on the liquid, the excess pressure being offset by return flow to the tank through by-pass 54. Thus, the by-pass includes an adjustable spring-loaded valve 55 which opens automatically to allow the return of liquid to the tank when the predetermined operating pressure of the liquid is exceeded. As an added feature, branch 56 of the by-pass line is provided with a manually operated valve 57 whereby the effective pressure of the liquid may be varied. A pressure gage G may be provided in the line 56 between valves 55 and 57.

It will be understood that while I have shown and described particular embodiments of my invention, various changes may be made in the system without departing from the spirit and scope of the appended claim.

I claim:

In a system for filling containers with liquid from a supply tank, said liquid having a vapor pressure at operating temperatures in excess of atmospheric pressure, a delivery line leading from the tank, means for pressurizing the liquid in said line, a pair of filling heads, a pair of filling nozzles, one on each head, releasably applicable, one each, in vapor tight relation to the filling openings of the containers, means for so applying the nozzles, a meter having intake communication with said delivery line, a pair of flow line connections leading from an output side of the meter and said filling heads, a pair of valves, one in each of the flow line connections, an interconnection between said valves, said interconnection opening either one of the valves by virtue of the closing of the other valve, whereby said heads are put alternately into communication with the output side of the meter, and means for closing the container openings prior to release of the heads therefrom.

EARNEST E. MARTIN.

REFERENCES CITED

The following references are of record in the file of this patent:

UNITED STATES PATENTS

| Number | Name | Date |
|---|---|---|
| 913,656 | Giron | Feb. 23, 1909 |
| 1,211,027 | Youngman | Jan. 2, 1917 |
| 1,312,351 | Peck | Aug. 5, 1919 |
| 1,443,550 | Wilkinson | Jan. 30, 1923 |
| 2,062,181 | Klaus | Nov. 24, 1936 |
| 2,075,678 | Von Langen | Mar. 30, 1937 |
| 2,188,676 | Crandall | Jan. 30, 1940 |